Jan. 8, 1963 F. SCHLELEIN 3,072,551
THERMONUCLEAR REACTOR
Filed March 6, 1959 4 Sheets-Sheet 1

INVENTOR.
FRIEDRICH SCHLELEIN
BY
RICHEY, McNENNY & FARRINGTON
ATTORNEYS

Jan. 8, 1963  F. SCHLELEIN  3,072,551
THERMONUCLEAR REACTOR
Filed March 6, 1959  4 Sheets-Sheet 2
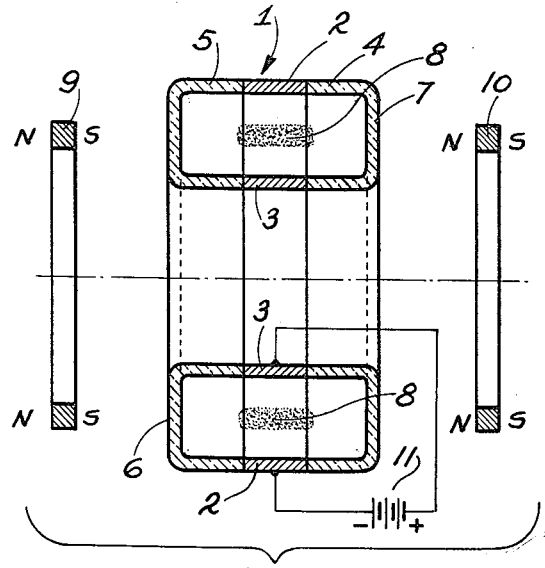
Fig. 2
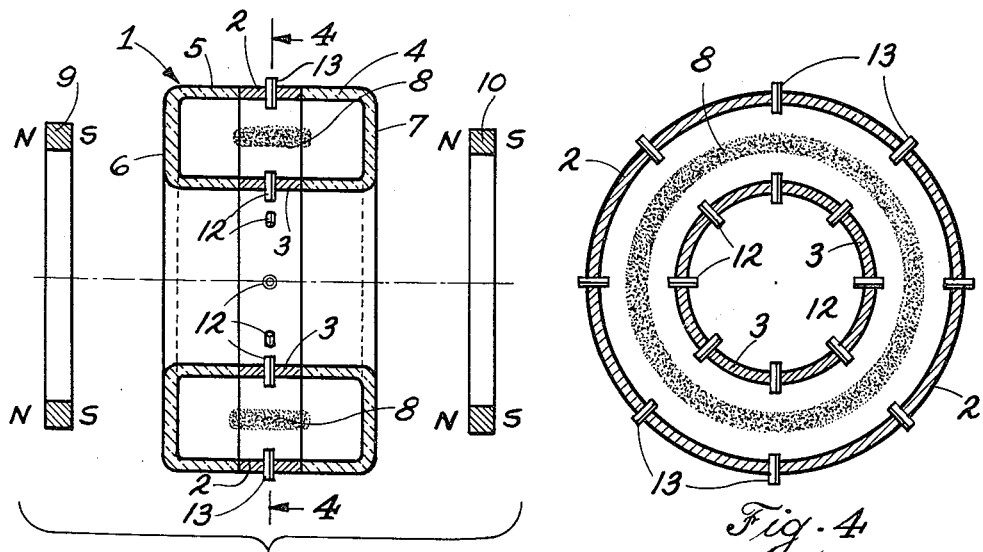
Fig. 3
Fig. 4
INVENTOR.
FRIEDRICH SCHLELEIN
BY RICHEY, McNENNY & FARRINGTON
ATTORNEYS

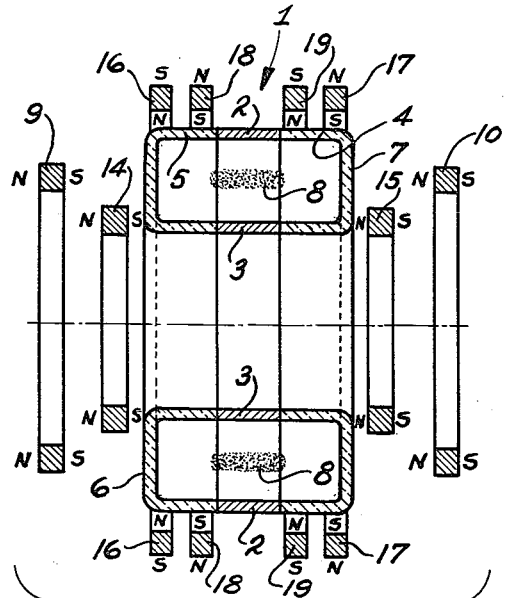
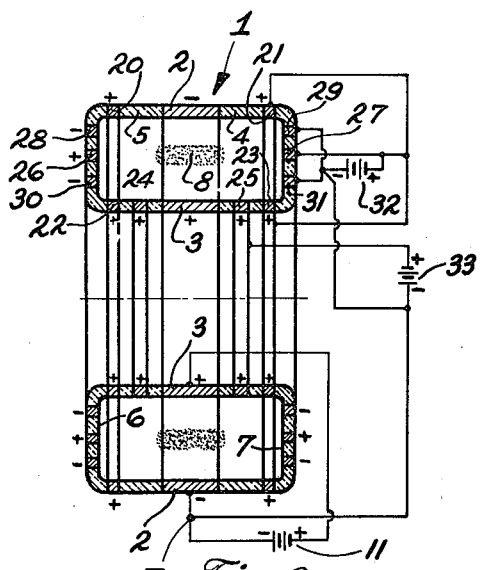
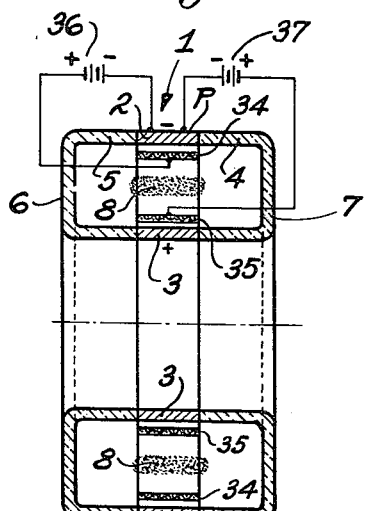
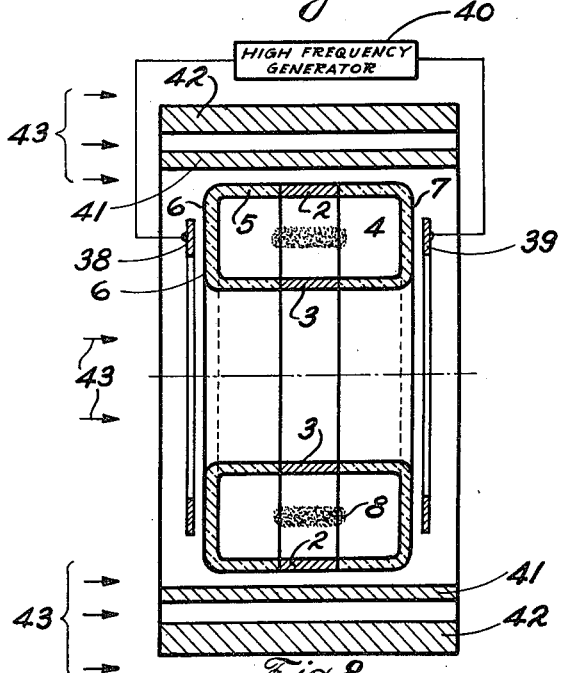

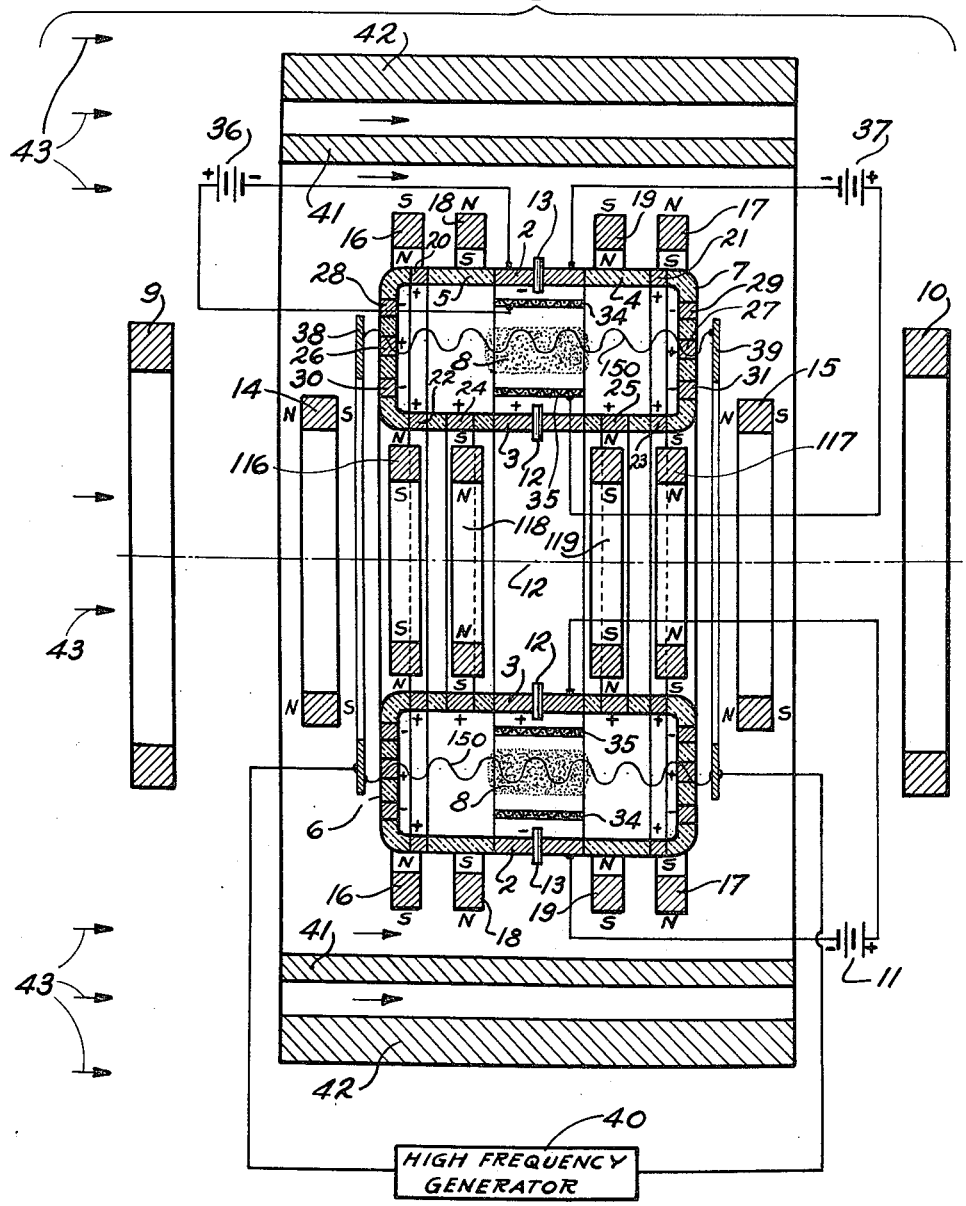

3,072,551
Patented Jan. 8, 1963

3,072,551
THERMONUCLEAR REACTOR
Friedrich Schlelein, Alfonsstrasse 11, Munich 2, Germany
Filed Mar. 6, 1959, Ser. No. 797,714
12 Claims. (Cl. 204—193.2)

This invention relates to a thermonuclear reactor.

A thermonuclear reaction is generally understood as the fusing or binding together of very light atomic nuclei by collision or reaction at very high temperatures to form heavier nuclei with the consequent release of the energy corresponding to the mass defect of the heavier nuclei. The two reacting particles may be called the target kernel or nucleus and the projectile kernel or nucleus and the particle which is produced therefrom is called the product kernel or nucleus.

The practical utilization of the mass defect in fusion, or thermonuclear reactions, is difficult because of the high temperatures required for the reaction. In an effort to carry on such a reaction in continuous operation, it has been proposed to maintain the target kernels or nuclei in a reaction zone plasma in a vacuum in a reaction container. By maintaining the reaction plasma spaced from the container walls in all directions, the container walls are maintained insulated from the heat of reaction against either heat conduction or heat convection. Thus, only the radiation produced by the reaction falls on the material walls of the reaction chamber and its protective enclosure.

Such a plasma is most simply formed as an ionized gas in an ionization chamber. The plasma is produced by admitting target kernels or nuclei and projectile kernels or nuclei through an inlet passage or passages into the interior of the evacuated recation container. A heavy electrical current is passed through the chamber, producing a magnetic field, and the electrical and magnetic field crossing the plasma vertically causes the particles to constrict and draw away from the walls of the container. The plasma contained and compressed by the electromagnetic field is connected to the surrounding electrical current stream which flows from a current supply through the reaction chamber. Through this connection the surrounding current stream receives a negative resistance characteristic, or slope, and so it becomes unstable. The purpose of the present invention is to maintain the reaction in a stable condition.

In accordance with the present invention a magnetic field is provided to maintain stability of the reacting atomic kernels or nuclei. The reaction chamber is preferably formed as an annular cylindrical condenser with cylindrical radially spaced electrodes between which the electric current flows radially through the annular chamber. The chamber is closed and a vacuum is maintained within it, except for the atoms or atomic particles which are admitted through inlet openings and are crowded together into a ring-shaped cloud or plasma, spaced from the walls of the chamber by the electro-magnetic field, produced by the radially flowing current. This pinch effect or crowding together of the atomic particles is maintained stable by an additional field, which may be magnetic, electro-static or a high frequency electric discharge, or a combination of these, which extends between the opposite axial endfaces of the ring-shaped reaction chamber, and thus through the reaction zone. The magnetic field may be produced by ring-shaped permanent magnets facing the annular end-faces of the container and polarized to provide opposed magnetic poles facing each other, or by similarly positioned electro magnets or solenoids.

In order to obtain the necessary atomic particles for the forming of the plasma, a number of inlet and outlet passages are distributed over the entire circumference of the annular electrodes through which the necessary atomic particles are admitted to the chamber. These passages lead to units maintained at the same vacuum desired in the reaction chamber, target and projectile kernels or nuclei being admitted through the inlets and product kernels or nuclei or other particles, such as canal rays, being removed through the outlets. The construction of these units is not material to the present invention. Any atomic particles which will fuse or react with the liberation of energy from the mass defect may be used, such as, for example, deuterium atoms, deuterium with tritium, and the like.

It is also possible to provide or reinforce this magnetic field by ring magnets surrounding the outer cylindrical wall of the reaction chamber on opposite sides of the outer cylindrical electrode, for instance, by rings of magnetic material whose inner and outer cylindrical surfaces form the magnet poles. In the case of several such rings, lying side by side, the north and south poles alternate in an axial direction.

The magnet rings provided adjacent the end faces of the reaction chamber can be sub-divided as desired in an axial direction; however, the magnetic polarity of such parallel rings is the same. For instance, the right hand endfaces of one magnet ring group are south poles, whereas the left hand endfaces are north poles. The same applies also to the symmetrically arranged magnet rings adjacent the opposite endface of the reaction chamber where the position of the magnet poles is exactly the same. In other words, all north poles will face in one direction axially of the annular reaction chamber, whereas all south poles will face in the opposite direction.

In addition to or instead of the magnets surrounding the outer cylindrical surface of the annular reaction chamber, magnet rings can also be provided within and adjacent the inner cylindrical surface of the annular reaction chamber. Instead of magnets comprising solid rings, bar magnets or other suitable magnet segments can be secured symmetrically in a circular arrangement with like poles facing in the same direction to provide a field similar to that of the polarized face of a ring magnet. As used herein, the term magnets is not limited to permanent magnets, but embraces any type of electro magnets or solenoids arranged to produce an equivalent magnetic field. It is also contemplated that when electro magnets or solenoids are used, the electrical current may flow continuously, or they may be energized by successive condenser discharges, as is known in the art.

In addition to the above arrangements for the production of magnetic fields, the invention also contemplates the use of electro-static fields. For this purpose symmetrically arranged annular conductors may be arranged on the inner and outer cylindrical surface and on the endfaces of the reaction chamber, on which conductors a potential is maintained to create an electrostatic field. It can be advantageous to give the individual conductors from a common current supply alternately a positive and negative potential.

To prevent electrons from entering the plasma or cloud of atomic particles and interfering with the nuclear reaction, it is also useful to provide a grid between the plasma and each of the cylindrical electrodes. The grids are maintained at a positive potential. These grids, especially the one which screens off the positive cylindrical electrode, can also be used for regulating purposes.

In addition to the above arrangements for the production of magnetic and electrical fields, it is advantageous to provide a ring-shaped high frequency field passing axially from end to end through the annular reaction chamber. This may be done by providing ring-shaped electrodes in addition to the previously described electrodes, arranged adjacent the axial endfaces of the reaction chamber, which electrodes are connected to the leads from a high frequency source. To simplify this arrangement, the ring magnets which are arranged adjacent the endfaces of the annular reaction chamber can be connected to the high frequency current supply to serve as electrodes.

In order to use the radiated energy produced by the thermonuclear reaction in the ring of plasma, jackets are provided to absorb the radiation. The jackets are preferably arranged at the points at which the major portion of the radiation emerges, i.e., about the outer cylindrical surfaces of the reaction chamber. However, it may also be necessary to continue the jacketing totally or partially around the end surfaces so as to make use of the radiation which emerges in an axial direction.

The jacketing consists preferably of separate layers of progressively increasing wall thicknesses, the wall thickness increasing radially outward. The wall thicknesses can be selected so that the separate jacketing layers absorb equal or substantially equal amounts of radiation. In a known manner, a suitable fluid or coolant is caused to flow through and around the jacketing layers and the reaction chamber to absorb and remove the heat produced by the radiation. Mechanical energy can be derived from the heat so imparted to the fluid in any desired manner.

In the accompanying drawings:

FIG. 2 is a cross section in an axial direction of the reactor shown in FIG. 1;

FIG. 3 is a view similar to FIG. 2 omitting the electrical circuit diagram and showing inlet and outlet passages;

FIG. 4 is a cross section taken on the line 4—4 of FIG. 3;

FIG. 5 is a view corresponding to FIG. 2 showing additional ring magnets;

FIG. 6 is a view similar to FIG. 2 showing annular conductors arranged to form condensers with a diagrammatic electrical circuit;

FIG. 7 is a view similar to FIG. 2 showing positively charged grids within the reaction chamber;

Figure 1:
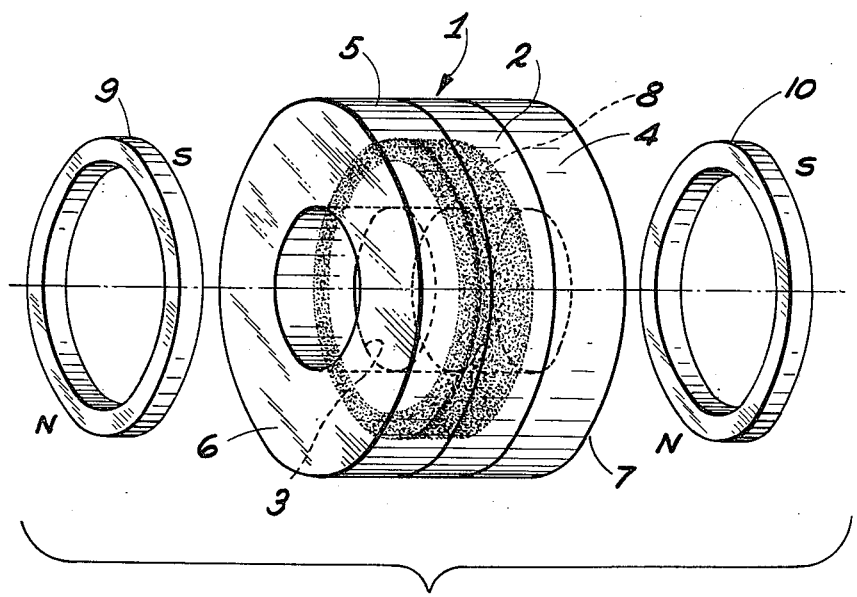
FIG. 1 is a perspective schematic view of a thermonuclear reactor involving the present invention.

FIG. 8 is an axial cross section through a reaction chamber showing jacketings for the absorption of radiation from the chamber and conductors arranged to produce a ring-shaped high frequency field passing axially through the chamber, and FIG. 9 is an axial cross section similar to FIG. 8, showing combined in one reactor the various arrangements of magnet rings, annular capacitors, positively charged grids and an annular high frequency field, all working together to promote stability of the reacting plasma.

In FIGS. 1 and 2 the reaction chamber 1 is shown as a hollow toroidal container with inner and outer substantially cylindrical radial walls and substantially flat parallel axial end faces. In the middle of the radial walls are arranged the substantially cylindrical electrodes 2 and 3, which form the condenser. As illustrated, the electrodes 2 and 3 are connected and insulated from each other by U-shaped annular members 4 and 5 of electrical insulating material, such as glass or quartz, which include the axial end faces 6 and 7 of the chamber. The plasma formed between the two cylindrical electrodes 2 and 3 is identified as 8. For illustration this plasma is comparatively sharply marked off; however, in practice this plasma shades into a small highly compressed central annular reaction zone. On both sides of the reaction chamber 1, adjacent the end faces 6 and 7, magnet rings 9 and 10 repectively are provided. As is to be seen from these figures, these magnets are polarized so that the axial end faces of each magnet ring form respectively a north pole and a south pole. Therefore, adjacent the end faces 6 and 7 are a south and a north pole, respectively.

In FIG. 2 is also shown diagrammatically the electrical circuit. A direct current source 11 has its positive side connected to the radially inner electrode 3 and its negative side connected to the outer electrode 2. The current source 11 is indicated by the symbol for a battery, but it is to be understood that any current source may be used and that the voltage and available amperage initiate and maintain the thermonuclear reaction.

In order to get the nuclear particles which form the plasma in sufficient number in the interior of the ring-shaped reaction chamber between the two electrodes 2 and 3 of the reaction chamber, outlet passages 13 are arranged on the outer electrode 2 and inlet passages 12 are arranged through electrodes 3, as can be seen on FIGS. 3 and 4. Product kernels or nuclei, canal rays and the like may be removed through the outlet passages passing through the negative electrode 2. One can see from FIGS. 3 and 4 that these passages are uniformly arranged over the entire circumference. The units which produce the nuclear particles and maintain the reaction chamber evacuated are not depicted in the drawings. Such units are known and their construction is not material to the present invention.

The embodiment of FIG. 5 corresponds in the main with that of FIGS 1 and 2; however, further magnet rings are provided in addition to magnet rings 9 and 10. Between end face 6 and magnet ring 9 a magnet ring 14 is arranged immediately adjacent end face 6. In the same manner a magnet ring 15 lies between end face 7 and magnet ring 10. The poles of magnet rings 9, 10, 14 and 15 are arranged that all like poles face in the same axial direction. These additional magnet rings strengthen the field of the magnets 9 and 10. Further magnet rings may be arranged about the cylindrical walls of the reaction chamber on each side of the electrodes 2 and 3. These symmetrically arranged magnet rings 16, 17 and 18, 19 differ from the previously mentioned magnet rings 9, 14 and 10, 15 through the fact that their magnet poles are on their inner and outer cylindrical surfaces, rather than their axial end faces, as can be seen in the pole identifications in FIG. 5. In addition to the just mentioned magnet rings around the outer circumference, there can also be provisions made for such magnet rings around the inner circumference of the reaction chamber. In FIG. 5 these magnet rings are omitted for reasons of clarity. These additional magnets around the outer and if necessary the inner circumference cause an additional concentration of the plasma 8.

In addition to the above described magnet arrangements, which, as already stated, do not absolutely have to consist of permanent magnets, but just as well can be formed through electromagnets or through solenoids, it can be advantageous to also use an electro-static field, produced either by spaced conductors forming a capacitance which can be arranged, for instance, in the walls of the reaction container by grids within the container, or by both capacitors and grids together.

FIG. 6 depicts an arrangement of ring-shaped capacitor elements in the walls of the reaction chamber. The illustrated elements can, of course, also be arranged on the outside surfaces of the walls. In the example in FIG. 6 ring electrodes 20 and 21 are formed in the outer cylindrical wall of the reaction chamber, in the glass or quartz, parts 4 and 5. In the same manner electrodes 22, 23, 24 and 25 are provided in the inner cylindrical wall. In addition thereto three concentric ring electrodes are arranged in each of the axial end walls 6 and 7, and they consist of middle, preferably positive, electrodes 26 and 27, as well as two outside and two inside electrodes 28, 29 and 30, 31. Reference point for the voltages applied to these electrodes is best point P, that is, the outside lying negative electrode 2 of the reaction chamber. In the right part of FIG. 6 the electrical connections to the individual electrodes are schematically indicated. The electrodes 21 and 23 are connected to the positive pole of battery 32. The negative pole of this battery is connected to the two end electrodes 29 and 31 and to the negative pole of battery 33, as well as the negative pole of battery 11, at the reference point of the outer negative cylindrical electrode 2. The positive pole of battery 33 is connected to the inner ring electrode 25.

The figures show only the respective connections for the ring electrodes which are arranged at the right side of the chamber. The respective ring electrodes for the left side of the chamber are correspondingly connected. It is self-understanding that batteries 11, 32 and 33 are only shown schematically and that in practice they may be replaced by entirely different current and voltage sources.

Instead of, or in addition to, the above described and connected concentric electrode rings, there can also be nu-grids provided in the interior of the reaction chamber. FIG. 7 shows that between the outside surface of the plasma 8 and the outside negative ring electrode 2 a grid 34 is arranged, whereas symmetrically thereto, between the plasma and the inner positive electrode 3, grid 35 lies. Both grids are connected to a positive direct voltage source, grid 34 to the positive pole of battery 36 and grid 35 to battery 37. The two negative poles of batteries 36 and 37 are connected to the negative electrode 2 at the mutual reference point P. For practical purposes it is best that the direct voltage applied to grids 34 and 35 from batteries 36 and 37 is variable so that through selection of the suitable voltage stable conditions in the interior of the reactor can be regulated.

In addition to the above described magnetic field produced by magnets and electrical field produced by ring electrodes, and/or grids, a further electrical field is useful, namely a high frequency field passing through the chamber axially, or perpendicular to the field between the electrodes 2 and 3, as shown in FIG. 8. For this purpose two ring-shaped outside electrodes 38 and 39 are arranged adjacent end walls 6 and 7, respectively. These ring electrodes are connected with a high frequency generator 40. The ring-shaped high frequency field then permeates in an axial direction the ring shaped reaction space of the container 1.

FIG. 8 shows also walls 41 and 42, between and over which a medium, or coolant, streams by in the direction of the arrows 43. These walls 41 and 32 are to absorb the radiation which emerges out of the container and which is produced in the plasma or the reaction zone, and to transform this radiation into heat. It does here not matter whether the streaming medium is a gas, steam or fluid medium. For best purposes the strength of the walls should with increasing distance from the reaction chamber become larger, whereby the strength can be measured in such a manner that in all walls, i.e., in the inner, thinner and in the outer, very thick walls, the same radiation and therefore heat amounts can be absorbed. While FIG. 8 shows these walls 41 and 42 only around the circumference of the reaction chamber these walls are only indicated schematically. It is to be understood that these walls are to be provided at every point where a substantial part of the radiation emerges to the outside. That means that the walls can also be drawn totally or partially around the end faces of the reaction chamber.

In FIG. 9 a schematic cross section of the reactor in accordance with the invention is again shown. FIG. 9 shows an embodiment incorporating all of the features shown separately in FIGS. 5, 6, 7, and 8. The same reference numbers apply here as in those figures. In addition thereto, inner magnet rings 116, 117 corresponding to the outer magnet rings 16 and 17, as well as rings 118 and 119, corresponding to outer magnet rings 18 and 19, are provided. The lines 150 between the outer ring electrodes 38 and 39 are to indicate the ring-shaped high frequency field between these electrodes, which is produced through the high frequency generator 40.

While preferred embodiments of the invention have been described in considerable detail, it will be understood that various modifications and re-arrangements thereof may be resorted to without departing from the scope of the invention as defined in the following claims.

What is claimed is:

1. A thermonuclear reactor for obtaining energy from a thermonuclear reaction comprising walls enclosing a hollow toroidal chamber, said walls having spaced electrical conductors, means to produce an electrical field passing radially through the interior of said chamber between said conductors, said walls including electrical insulating material insulating said conductors from each other, a passage opening into the interior of said chamber for the admission of atomic particles adapted to react with each other, said chamber being adapted to be otherwise substantially evacuated and to maintain a nuclear reaction between said particles in a zone spaced in all directions from the walls of said chamber, by the compression of said particles toward each other by means of and electro-magnetic field extending between said conductors, means producing a magnetic field extending through the interior of said chamber in a direction perpendicular to the electro-magnetic field between said conductors, capacitor elements symmetrically arranged around and insulated from said conductors, said capacitor elements being adapted to be connected to voltage sources to establish an electrostatic field within said chamber around said zone, positively charged grids within said chamber arranged between each of said conductors and said zone, and electrodes on opposite sides of said chamber adapted to be connected to a high frequency generator to establish a high frequency field extending through said chamber in a direction perpendicular to the electro-magnetic field between said conductors.

2. A thermonuclear reactor for obtaining energy from a thermonuclear reaction comprising walls enclosing a hollow toroidal chamber, said walls having radially spaced electrical conductors on the radially inner and outer peripheries thereof, means to produce an electrical field passing radially through the interior of said chamber between said conductors, said walls including electrical insulating material insulating said conductors from each other, passages opening into the interior of said chamber for the admission of atomic particles adapted to react with each other, said chamber being adapted to be otherwise substantially evacuated and to maintain a nuclear reaction between said particles in a ring-shaped zone spaced in all directions from the walls of said chamber, by the compression of said particles toward each other by means of a radially extending electro-magnetic field between said conductors, and means producing an axially extending annular magnetic field through the interior of said chamber with opposite magnetic polarities adjacent the opposite endfaces of said chamber.

3. A thermonuclear reactor according to claim 2, including a plurality of inlet and outlet passages for the atomic particles extending radially into said chamber through said conductors and spaced around the entire inner and outer peripheries of said chamber.

4. A thermonuclear reactor according to claim 2, embodying ring-shaped magnets arranged adjacent and substantially parallel with the axial end faces of said chamber having surfaces of opposite polarities facing each other and aligned axially with the interior of said chamber.

5. A thermonuclear reactor according to claim 2, embody symmetrically arranged ring-shaped magnets extending around and adjacent to a radial side wall of said chamber and spaced axially on opposite sides of said electrical conductors.

6. A thermonuclear reactor according to claim 4, embodying a plurality of axially spaced concentric ring-shaped magnets adjacent each axial endface of said chamber.

7. A thermonuclear reactor comprising a hollow toroidal chamber having spaced electrical conductors forming radially opposed wall portions, means to produce an electrical field passing radially between said conductors through said chamber, said chamber having other wall portions of electrical insulating material insulating said conductors from each other, said chamber having a passage opening into the interior thereof for the admission of atomic particles adapted to react with each other, said chamber being adapted to be otherwise substantially evacuated and to maintain a nuclear reaction between said particles in a zone spaced in all directions from the walls of said chamber by the compression of said particles toward each other by the electro-magnetic field extending between said conductors, and positively charged grids within said chamber arranged between each of said conductors and said zone.

8. A thermonuclear reactor comprising a hollow toroidal chamber having spaced electrical conductors forming radially opposed wall portions, means to produce an electrical field passing radially between said conductors through said chamber, said chamber having other wall portions of electrical insulating material insulating said conductors from each other, said chamber having a passage opening into the interior thereof for the admission of atomic particles adapted to react with each other, said chamber being adapted to be otherwise substantially evacuated and to maintain a nuclear reaction between said particles in a zone spaced in all directions from the walls of said chamber by the compression of said particles toward each other by the electro-magnetic field extending between said conductors, and electrodes on opposite sides of said chamber adapted to be connected to a high frequency generator to establish a high frequency field extending through said chamber in a direction perpendicular to the electro-magnetic field between said conductors.

9. A thermonuclear reactor comprising a hollow toroidal chamber having spaced electrical conductors forming radially opposed wall portions, means to produce an electrical field passing radially between said conductors through said chamber, said chamber having other wall portions of electrical insulating material insulating said conductors from each other, said chamber having a passage opening into the interior thereof for the admission of atomic particles adapted to react with each other, said chamber being adapted to be otherwise substantially evacuated and to maintain a nuclear reaction between said particles in a zone spaced in all directions from the walls of said chamber by the compression of said particles toward each other by the electro-magnetic field extending between said conductors, and magnets on opposite sides of said chamber having surfaces of opposite polarity facing each other and producing a magnetic field extending through the interior of said chamber in a direction perpendicular to the electro-magnetic field extending between said conductors.

10. A thermonuclear reactor comprising a hollow toroidal chamber having spaced electrical conductors forming radially opposed wall portions, means to produce an electrical field passing radially between said conductors through said chamber, said chamber having other wall portions of electrical insulating material insulating said conductors from each other, said chamber having a passage opening into the interior thereof for the admission of atomic particles adapted to react with each other, said chamber being adapted to be otherwise substantially evacuated and to maintain a nuclear reaction between said particles in a zone spaced in all directions from the walls of said chamber by the compression of said particles toward each other by the electro-magnetic field extending between said conductors, capacitor elements symmetrically arranged around and insulated from said conductors, said capacitor elements being connected to voltage sources to establish an electro-static field within said chamber around said zone.

11. A thermonuclear reactor comprising walls enclosing a hollow toroidal chamber, said walls having radially spaced electrical conductors on the radially inner and outer peripheries thereof, means to produce an electrical field passing radially through the interior of said chamber, said walls including electrical insulating material insulating said conductors from each other, means producing an axially extending annular magnetic field through the interior of said chamber, passages opening into the interior of said chamber for the admission of atomic particles adapted to react with each other, said chamber being adapted to be otherwise substantially evacuated and to maintain a nuclear reaction between said particles in a ring-shaped zone spaced in all directions from the walls of said chamber by the compression of said particles toward each other by means of said electrical field and said magnetic field, and grids within said chamber a spaced distance from said conductors and extending around said toroidal chamber, said grids defining a path between said grids and between said conductors.

12. A thermonuclear reactor comprising walls enclosing a hollow toroidal chamber, said walls having radially spaced electrical conductors on the radially inner and outer peripheries thereof, means to produce an electrical field passing radially through the interior of said chamber, said walls including electrical insulating material insulating said conductors from each other, means producing an axially extending annular magnetic field through the interior of said chamber, passages opening into the interior of said chamber for the admission of atomic particles adapted to react with each other, said chamber being adapted to be otherwise substantially evacuated and to maintain a nuclear reaction between said particles in a ring-shaped zone spaced in all directions from the walls of said chamber by the compression of said particles toward each other by means of said electrical field and said magnetic field, and grids within said chamber a spaced distance from said conductors and extending around said toroidal chamber, said grids defining a path between said grids and between said conductors, said grids being positively charged to confine positively charged particles to said path and to attract electrons away from said path.

References Cited in the file of this patent

UNITED STATES PATENTS

| | | |
|---|---|---|
| 1,137,964 | Goddard | May 4, 1915 |
| 1,714,405 | Smith | May 21, 1929 |
| 1,948,384 | Lawrence | Feb. 20, 1934 |
| 2,330,849 | Smith | Oct. 5, 1943 |
| 2,813,992 | Linder | Nov. 19, 1957 |
| 2,868,991 | Josephson | Jan. 13, 1959 |
| 2,933,611 | Foster | Apr. 19, 1960 |
| 2,993,851 | Thomson et al. | July 28, 1961 |
| 3,016,342 | Kruskel et al. | Jan. 9, 1962 |

OTHER REFERENCES

Richard F. Post: Reviews of Modern Physics, volume 28, Number 3, July 1956, pages 338, 339, 340, 344, 345, 359.

Project Sherwood, by Amasa S. Bishop, Addison-Wesley Publ. Co., Reading, Mass., September 1958, pages 185, 189, 6–14.

Vol. 31 of Proceedings of the Second United Nations International Conference on the Peaceful Uses of Atomic Energy, United Nations, Geneva (1958), pages 6, 30–32, 34–38, 320, 322.

Vol. 32 of above Proceedings, pages 42–51, 92–99.

Chem. & Eng. News, June 2, 1958, page 46.